United States Patent Office 3,331,828
Patented July 18, 1967

3,331,828
ISOLATION OF γ-L-GLUTAMYL DIPEPTIDES FROM GLUTAMIC ACID FERMENTATION BROTHS BY ION EXCHANGE
Edward S. Inamine, Pleasant Hill, Calif., and Theodore A. Jacob, Westfield, and Ronald A. Vitali, Ridgefield, N.J., assignors to Merck & Co., Inc., Rahway, N.J., a corporation of New Jersey
No Drawing. Filed Sept. 30, 1964, Ser. No. 400,566
8 Claims. (Cl. 260—112.5)

The present invention relates to processes for isolating glutamyl peptides and to processes for purifying glutamic acid fermentation liquor. More particularly, this invention is concerned with ion exchange processes for removing γ-L-glutamyl peptides from glutamic acid fermentation liquor.

It should be understood at the outset that the term "fermentation liquor" as used in this specification is intended to include whole broth, filtered whole broth, amino acid-peptide mixture after nutrient and decomposition product separation, broth with glutamic acid partially removed, and concentrated broth, either with or without the acid producing microorganism.

Glutamic acid is a well-known seasoning material which finds use in the preparation of many kinds of foods. It is prepared by biosynthetic processes by use of microorganisms of the genera Aerobacter, Bacillus, Pseudomonas, Micrococcus, Serratia, Proteus, Escherichia, Xanthomonas, Sarcina, Corynebacterium, Bacterium and others. During the biosynthesis, certain impurities, for example glutamyl peptides, such as the dipeptides γ-L-glutamyl-L-glutamic acid, γ-L-glutamyl-L-valine, and γ-L-glutamyl-L-leucine, are formed along with the desired glutamic acid product.

Normally, glutamic acid is isolated from a fermentation broth either by direct crystallization or by ion exchange chromatography, and the glutamyl peptides formed are normally not removed by either of these processes. Accordingly, when the acid is produced by fermentation and particularly when isolated from fermentation broth by the use of continuous recovery processes, glutamyl peptides such as those named above tend to accumulate in recovery streams. In so doing, they assert an adverse effect on the ease of crystallization, filtration, and recovery of the glutamic acid. This is particularly so when the γ-L-glutamyl peptides are present in fermentation liquor in amounts greater than about 0.5% by weight of glutamic acid. The filtration properties of glutamic acid become even less desirable when the amount of γ-glutamyl peptide present in fermentation liquor is 2% or greater by weight of glutamic acid. The crystallized glutamic acid containing relatively large quantities of the γ-glutamyl peptides, in addition to being difficult to filter, also tends to retain an excessive amount of moisture thereby necessitating prolonged drying and additional production expense.

It is an object of this invention to provide a method for isolating γ-glutamyl peptides from a fermentation liquor. Another object of this invention is to provide a method for purifying glutamic acid fermentation liquor. Still another object is provision of a means for securing glutamic acid which is readily filterable. A further object of the present invention is to provide a means for preventing accumulation of γ-L-glutamyl peptides in a fermentation liquor containing L-glutamic acid. Still other objects will become apparent from the following description of the invention.

It has been found, according to the present invention, that separation of γ-L-glutamyl peptides from a glutamic acid fermentation liquor by anion exchange chromatography using a strongly basic anion exchange resin is useful in isolating the peptide and in effectively permitting formation of a desired glutamic acid crystal structure, relatively simple filtration, and the obtaining of a crystalline product having low moisture retention properties. Anion exchange resins which may be utilized are strongly basic resins having a quaternary ammonium type of structure in which three loweralkyl groups such as methyl and a polymeric benzyl group are attached to the nitrogen atom. The resin may also contain minor amounts of divinylbenzene as copolymerizate. An example of this triloweralkylbenzyl ammonium type of resin is Dowex 1, X-2, which is prepared according to the process described in the example in U.S. Patent 2,591,573.

According to the processes of the present invention, fermentation liquor having a pH of between about 7 and 11 is brought into contact with Dowex 1, X-2, resin on a weak organic acid anion cycle. The glutamyl peptides and the glutamic acid in the fermentation liquor are thereby adsorbed on the resin and are then selectively eluted with a weak organic acid of various concentrations to displace the adsorbed material. Acids useful both for preparing the resin and eluting the peptides in the processes of this invention include benzoic acid, acetic acid, formic acid, butyric acid, carbonic acid, succinic acid, citric acid, cyanuric acid, glutaric acid, lactic acid, naphthoic acid, nicotinic acid, uric aid, valerc acd, sulfanilic acid, propionic acid, and the like. The concentration of the eluting acid may vary from about 0.2 N to about 3.0 N depending upon the acidity of the particular compound to be eluted. The glutamic acid separated as a result of the elution may be recycled, or it or the dipeptides may be recovered, or purified further by standard techniques, such as concentration and crystallization.

It has now been found that glutamic acid may be eluted before the dipeptide impurities when eluent having a normality of about 0.2 N to about 0.3 N is used. When extraction or isolation of γ-L-glutamyl-L-valine or γ-L-glutamyl-L-leucine is desired, further elution with weak organic acid of about the same normality as that used to elute the glutamic acid may be used. When, on the other hand, the isolation of γ-L-glutamyl-L-glutamic acid is desired, the concentration of the eluent should be about 2.0 N to about 3.0 N, preferably about 2.5 N.

A mixture of peptides such as one containing γ-L-glutamyl-L-valine and γ-L-glutamyl-L-leucine may be separated to obtain the individual constituents in greater purity by additional chromatographic treatment using the type of resin and procedure aforementioned. A weak organic acid of low concentration, for example about .05 N acetic acid, may be used as the eluent to effect the separation. According to this procedure, it is found that γ-L-glutamyl-L-valine is eluted early in the chromatographic process thereby permitting its separation from the later eluted γ-L-glutamyl-L-leucine.

The following examples are given for the purpose of illustration and not by way of limitation.

EXAMPLE 1

*Separation of peptides from fermentation liquor*

A glutamic acid fermentation whole broth is obtained by the procedure described in Example 1A of United States Patent 3,080,297. This broth is then treated to remove glutamic acid by standard procedures until fermentation liquor having a concentration of about 20 mg./ml. of L-glutamic acid and about 6 mg./ml. of γ-L-glutamyl dipeptides is obtained. About 20 liters of this fermentation liquor is chromatographed on a column 15 cm. x 115 cm. containing 18 liters of Dowex 1, X-2 resin. The column is first placed on an acetate cycle by passing 1 N acetic acid over the resin and washing it with water. A stepwise elution with 0.25 N, 1 N and 2.5 N acetic acid is then performed. The neutral amino acids, alanine, valine, and leucine, are washed through the column with 10 four liter fractions of water and are collected (eluate A). Elution with 0.25 N acetic acid using 14 four liter portions brings off glutamic acid substantially free of glutamyl peptide (eluate B). Elution with an additional 31 four liter fractions of 0.25 N acetic acid gives eluate C which is composed of a mixture of γ-L-glutamyl-L-valine and γ-L-glutamyl-L-leucine. Further elution using 11 four liter fractions of 1 N acetic acid does not remove any other material. The use of 10 four liter fractions of 2.5 N acetic acid does not elute any further material. A third peptide, γ-L-glutamyl-L-glutamic acid, is eluted when 3 additional four liter portions of 2.5 N acetic acid are poured into the column (eluate D).

When the above procedure is carried out using resin on the formate cycle instead of the acetate cycle and formic acid instead of acetic acid as eluent, similar separation is obtained.

When the above resin is saturated with glutamic acid before passage of the fermentation liquor over it, the column effluent contains a glutamyl peptide concentration lower than that in the infused liquor.

EXAMPLE 2

γ-L-glutamyl-L-glutamic acid

Eluate D obtained according to the procedure of Example 1 is concentrated at 40° C. in vacuo to a volume of about 200 ml. A light brown syrup results which is dissoved in acetone-water (1:1) and treated with charcoal. Acetone is then added to crystalline the product which is again dissolved in acetone-water (1:1). Acetone is added and a product composed of white needles is obtained. The product is γ-L-glutamyl-L-glutamic acid; M.P. 194–194.5° C., specific rotation $[\alpha]_D^{25° C.} = +4.60$ (c.=2, 0.5 N HCl).

EXAMPLE 3

Separation of γ-L-glutamyl-L-valine and γ-L-glutamyl-L-leucine

Eluate C obtained according to the procedure of Example 1 is concentrated in vacuo at 40° C. to about 3 liters. The residue is freeze dried and 113 gm. of a mixture of γ-L-glutamyl-L-valine and γ-L-glutamyl-L-leucine is obtained.

25 gm. of the above mixture is dissolved in 200 ml. of water and the pH is adjusted to pH 9 with concentrated ammonium hydroxide. The sample is charged to a column 3 cm. x 175 cm. containing 1 liter of Dowex 1, X–2, resin. The column is placed on an acetate cycle by passing 1 N acetic acid over the resin and water washing. The adsorbed material is then eluted with 145 half liter volumes of 0.05 N acetic acid.

EXAMPLE 4

γ-L-glutamyl-L-valine

The fiftieth to the sixtieth fractions inclusive obtained according to the procedure of Example 3 are combined and concentrated at 40° C. in vacuo to about 100 ml. and filtered while warm. Acetone is added to crystallize γ-L-glutamyl-L-valine; on recrystallization from a mixture of acetone and water (1:1) the pure product is obtained; M.P. 206–207° C., specific rotation $[\alpha]_D^{25° C.} = +8.70$ (c.=2, 0.5 N HCl).

EXAMPLE 5

γ-L-glutamyl-L-leucine

The last eleven half liter volumes of eluate obtained from the procedure of Example 3 are combined and concentrated at 40° C. in vacuo to about 100 ml. and filtered while still warm. The crystals are dissolved in a water-acetone mixture (1:1) and the solution is evaporated. The residue is dissolved in water-acetone (1:1) and recrystallized by concentration in vacuo giving substantially pure γ-L-glutamyl-L-leucine; M.P. 185° C., specific rotation $[\alpha]_D^{25° C.} = -6.80$ (c.=2, 0.5 N HCl).

It should be understood that although this invention has been described with reference to particular embodiments thereof, changes and modifications may be made which are within its intended scope and it should be limited only by the language of the appended claims.

We claim:

1. A process for isolating glutamyl peptides which comprises contacting a glutamic acid fermentation liquor with anion exchange resin of the strongly basic trimethylbenzyl ammonium type on a weak organic acid anion cycle, eluting the resin with weak organic acid, and recovering the glutamyl peptides from eluate thereby obtained.

2. A process for isolating glutamyl peptides which comprises contacting a glutamic acid fermentation liquor with anion exchange resin of the strongly basic trimethylbenzyl ammonium type on a weak organic acid anion cycle, eluting the resin with weak organic acid having a concentration of between 0.2 N and 3.0 N, and recovering the glutamyl peptides from eluate thereby obtained.

3. A process for isolating glutamyl dipeptides which comprises contacting a glutamic acid fermentation liquor with anion exchange resin of the strongly basic trimethylbenzyl ammonium type on a member of the group consisting of the acetate and the formate cycle, eluting the resin bed with an acid selected from the group consisting of acetic acid and formic acid having a concentration of between 0.2 N and 3.0 N, and recovering the glutamyl dipeptides from eluate thereby obtained.

4. A process for isolating glutamyl dipeptides which comprises contacting a glutamic acid fermentation liquor with basic anion exchange resin of the strongly basic trimethyl-benzyl ammonium type on the acetate cycle, successively eluting the resin bed with about 0.25 N acetic acid and about 2.5 N acetic acid, and recovering the glutamyl dipeptides from eluate thereby obtained.

5. A process for isolating γ-L-glutamyl-L-valine and γ-L-glutamyl-L-leucine, which comprises contacting a glutamic acid fermentation liquor with basic anion exchange resin of the strongly basic trimethyl-benzyl ammonium type on the acetate cycle, eluting the resin bed with about 0.25 N acetic acid, and recovering the γ-L-glutamyl-L-valine and γ-L-glutamyl-L-leucine from eluate thereby obtained.

6. A process for isolating γ-L-glutamyl-L-glutamic acid which comprises contacting a glutamic acid fermentation liquor with basic anion exchange resin of the strongly basic trimethyl-benzyl ammonium type on the acetate cycle, eluting the resin bed with about 2.5 N acetic acid, and recovering the γ-L-glutamyl-L-glutamic acid from eluate thereby obtained.

7. A process for purifying glutamic acid fermentation liquor which comprises contacting a glutamic acid fermentation liquor having at least 0.5% by weight of dipeptide per weight of glutamic acid with basic anion exchange resin of the strongly basic trimethyl-benzyl ammonium type on a weak organic acid anion cycle and eluting the resin with weak organic acid having a concentration of between 0.2 N and 0.3 N.

8. A process for purifying glutamic acid fermentation liquor which comprises contacting a glutamic acid fermentation liquor having at least 0.5% by weight of dipeptide per weight of glutamic acid with basic anion exchange resin of the strongly basic trimethyl-benzyl ammonium type on a member of the group consisting of the acetate and the formate cycle and eluting the resin with an acid selected from the group consisting of acetic acid and formic acid having a concentration of between 0.2 N and 0.3 N.

(References on following page)

References Cited

UNITED STATES PATENTS

| | | | |
|---|---|---|---|
| 2,664,441 | 12/1953 | Owens et al. | 260—527 |
| 3,029,280 | 4/1962 | Motozaki et al. | 260—527 |
| 3,080,287 | 3/1963 | Phillips et al. | 195—47 |
| 3,173,949 | 3/1965 | Tanaka et al. | 260—527 |

FOREIGN PATENTS

| | | |
|---|---|---|
| 1,088,975 | 8/1960 | Germany. |

OTHER REFERENCES

Greenstein et al.: Chemistry of the Amino Acids, vol. II, New York, John Wiley & Sons, Inc., 1961, pp. 1491–1495.

Schroder, in Ion Exchangers in Organic and Biochemistry, New York, Interscience Publishers, 1957, pp. 299–317.

Vitali et al.: J. Biol. Chem. 240, 2508–2511 (1965).

LEWIS GOTTS, *Primary Examiner.*

ELBERT L. ROBERTS, *Examiner.*

M. M. KASSENOFF, *Assistant Examiner.*